United States Patent [19]
Hoshino

[11] Patent Number: 5,926,261
[45] Date of Patent: Jul. 20, 1999

[54] FINGER FIXING APPARATUS

[75] Inventor: Satoshi Hoshino, Tokyo, Japan

[73] Assignee: NEC Corporation, Tokyo, Japan

[21] Appl. No.: 09/003,334

[22] Filed: Jan. 6, 1998

[30] Foreign Application Priority Data

Jan. 9, 1997 [JP] Japan ..................................... 9-002000
Jan. 9, 1997 [JP] Japan ..................................... 9-002001

[51] Int. Cl.[6] ..................................................... G06K 9/74
[52] U.S. Cl. ............................................................. 356/71
[58] Field of Search .............. 356/71, 244; 382/124–127

[56] References Cited

U.S. PATENT DOCUMENTS 3,614,737 10/1971 Sadowsky .................................. 356/71

*Primary Examiner*—Robert H. Kim
*Assistant Examiner*—Amanda Merlino
*Attorney, Agent, or Firm*—Sughrue, Mion, Zinn Macpeak & Seas, PLLC

[57] ABSTRACT

A finger fixing apparatus includes a base, a scanner unit, and a finger press band. The base has a fingerprint read window. The scanner unit is arranged below the fingerprint read window. The finger press band extends above the fingerprint read window in a direction perpendicular to a finger inserting direction while ensuring a predetermined space. The finger press band is positioned to correspond to the fingerprint read window.

12 Claims, 4 Drawing Sheets

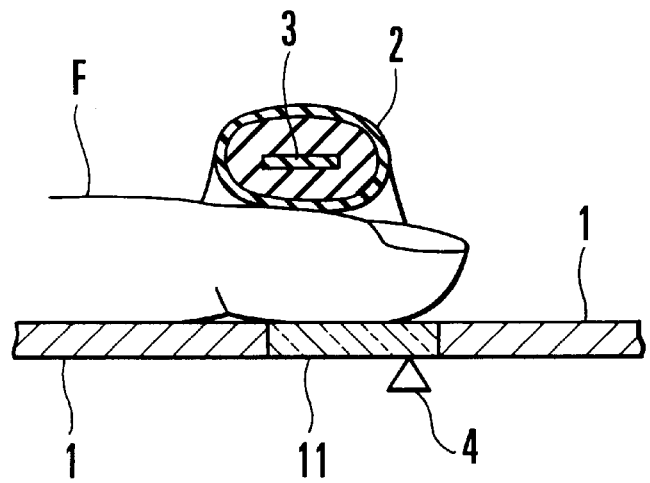
F I G. 6
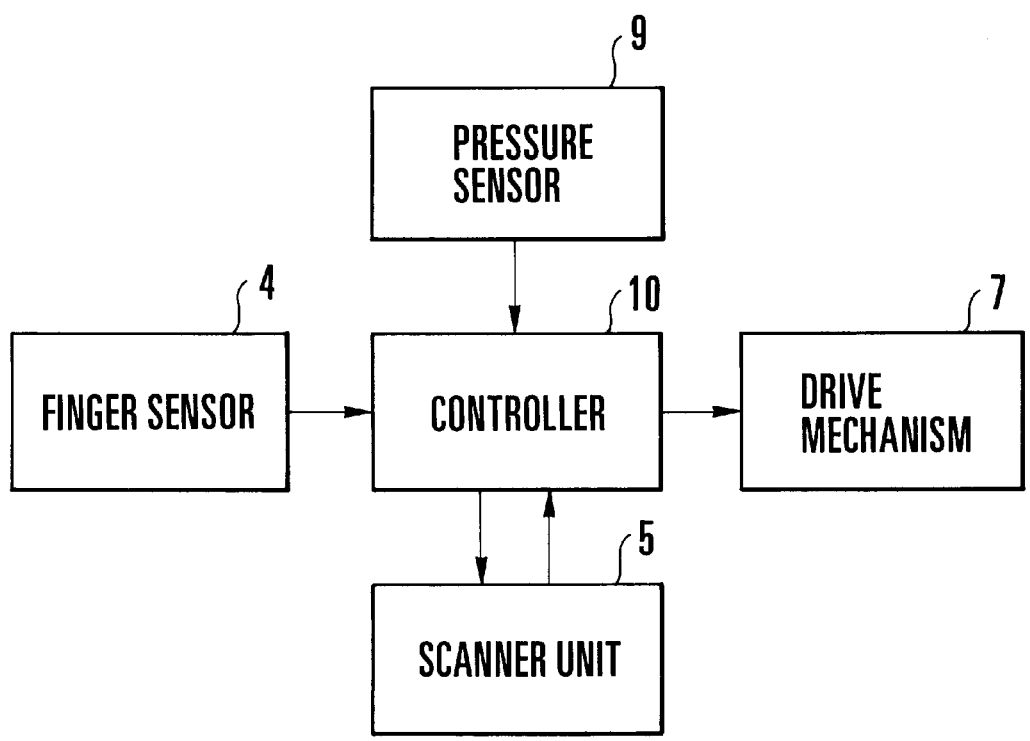
F I G. 7

FINGER FIXING APPARATUS

BACKGROUND OF THE INVENTION

The present invention relates to a finger fixing apparatus and, more particularly, to a finger fixing apparatus for fixing a finger when reading a fingerprint with a fingerprint authentication apparatus.

A human fingerprint is unique to each individual person. A fingerprint authentication apparatus is under development, which fetches the fingerprint as image data and compares the feature amount of the fetched image data with fingerprint feature amount data of a plurality of persons which are registered in advance, thereby authenticating the individual person. A fingerprint authentication apparatus of this type is generally constituted by a fingerprint read glass window formed in the base surface, and a scanner unit arranged below the base surface to read the fingerprint through the glass window. When a person to be authenticated places his fingertip on the glass window, the fingerprint image of the fingertip seen through the glass window is read by the scanner unit. A predetermined feature amount is extracted from the read image data, and is compared with the fingerprint feature amount data of each individual registered in advance. When the feature amount coincides with the fingerprint feature amount data, it is determined that the person to be authenticated is the right person, i.e., the registered authenticated person.

In the conventional case described however, due to limitations in cost and component arrangement, a large read window and a large readable region for the scanner unit cannot be ensured. For this reason, depending on how the finger of the person to be authenticated is placed, i.e., depending on where the finger is placed or in which direction the finger is placed, an effective fingerprint image cannot be picked up. Then, even if the person to be authenticated is the right person, he may be failed to be authenticated.

SUMMARY OF THE INVENTION

It is an object of the present invention to provide a finger fixing apparatus which can easily pick up an effective fingerprint image.

In order to achieve the above object, according to the present invention, there is provided a finger fixing apparatus comprising a base having a fingerprint read window, a scanner unit arranged below the fingerprint read window, and a finger press member extending above the fingerprint read window in a direction perpendicular to a finger inserting direction while ensuring a predetermined space, the finger press member being positioned to correspond to the fingerprint read window.

BRIEF DESCRIPTION OF THE DRAWINGS

FIG. 6 is a sectional view taken along the line II—II of FIG. 4; and

FIG. 7 is a block diagram of the fingerprint authentication apparatus shown in FIG. 4.

DESCRIPTION OF THE PREFERRED EMBODIMENTS

The present invention will be described in detail with reference to the accompanying drawings.

Figure 1:
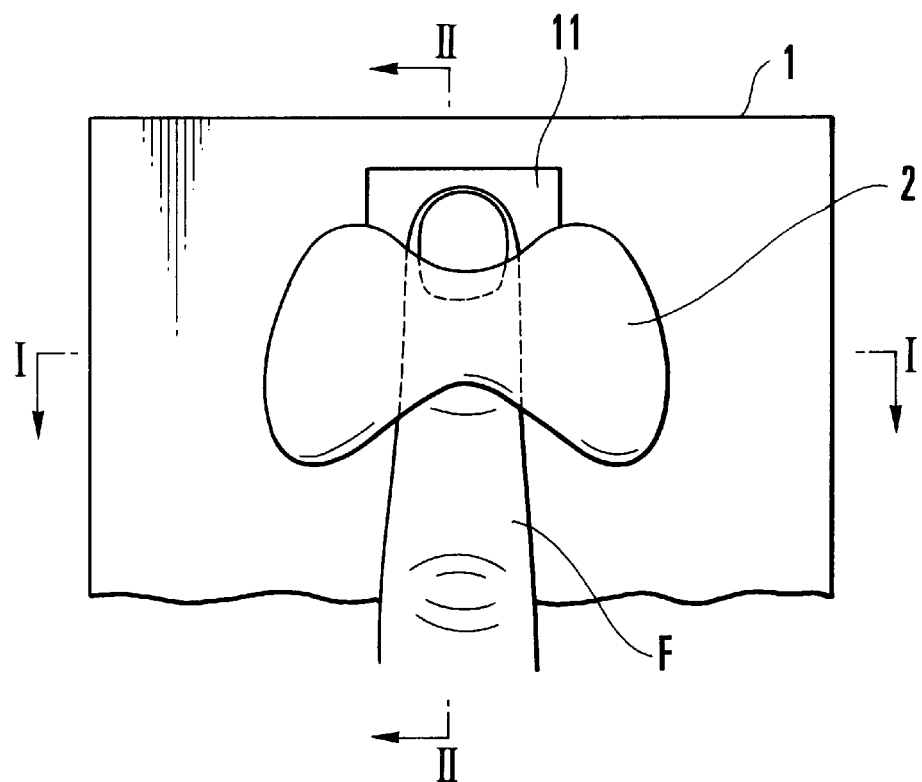
FIG. 1 is a plan view of a fingerprint authentication apparatus according to the first embodiment of the present invention.
Figure 2:
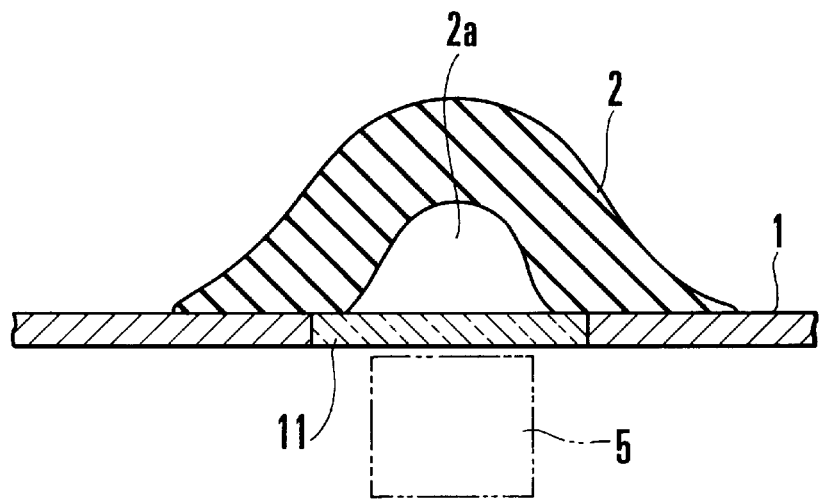
FIG. 2 is a sectional view taken along the line I—I of FIG. 1.
Figure 3:
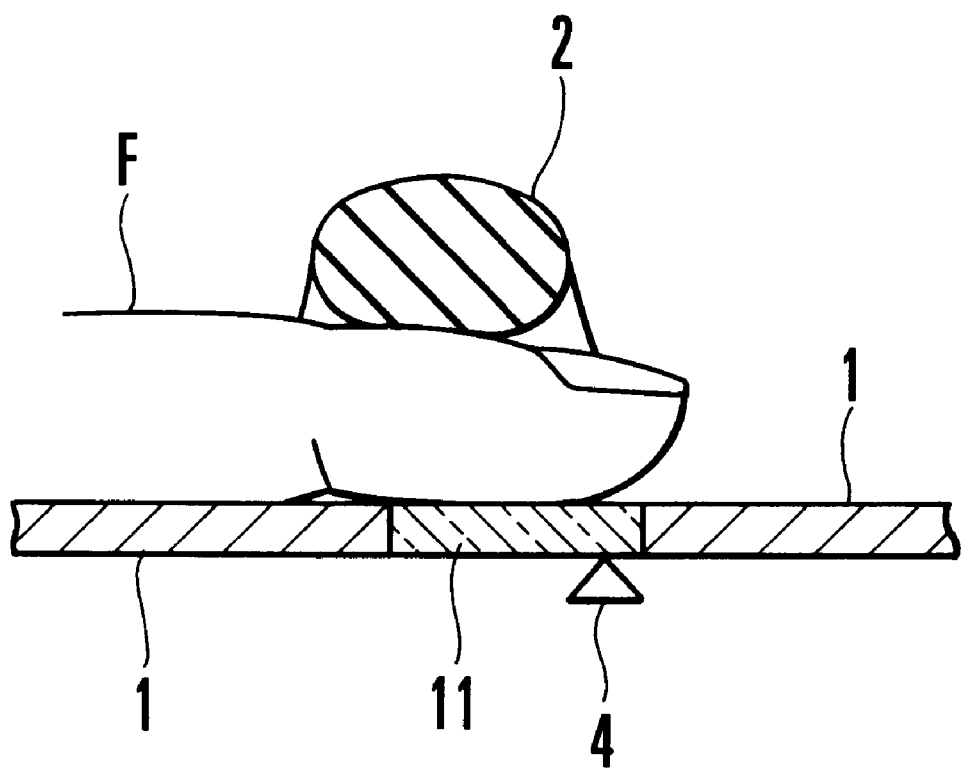
FIG. 3 is a sectional view taken along the line II—II of FIG. 1.

FIG. 1 shows a fingerprint authentication apparatus according to the first embodiment of the present invention, FIG. 2 shows a section taken along the line I—I of FIG. 1, and FIG. 3 shows a section taken along the line II—II of FIG. 1. Referring to FIG. 1, the fingerprint authentication apparatus has a base 1, a finger press band 2 for positioning a finger F, and a scanner unit 5. The base 1 has a rectangular fingerprint read window 11 made of transparent glass. The finger press band 2 extends above the fingerprint read window 11 from one side to the other side to ensure a space slightly smaller than the sectional area of one finger F. The two end portions (two wings) of the finger press band 2 are fixed to the base 1. The scanner unit 5 is arranged below the fingerprint read window 11 to correspond to the positioned finger F.

As shown in FIG. 1, the width of the central portion of the finger press band 2 is smaller than that of each of the two end portions thereof fixed to the surface of the base 1. In this embodiment, the finger press band 2 is formed thick from a silicone resin and has an elasticity. The finger press band 2 can be made of any material as far as it is soft to the finger and can press the finger F against the fingerprint read window 11 with an appropriate elasticity, like polyurethane or a styrene-based thermoplastic elastomer.

As shown in FIG. 2, the finger press band 2 is formed to have an inverted U-shaped section having a space 2a. The surfaces of the two end portions of the finger press band 2 which are to be fixed to the base 1 are formed flat, and are fixed to the surface of the base 1 with an adhesive.

In the finger fixing apparatus having the above arrangement, when the person to be authenticated moves his fingertip forward into the space 2a between the finger press band 2 and fingerprint read window 11, the finger press band 2 is gradually deformed to accept the finger F while expanding. When the person to be authenticated further moves his finger F forward, the finger F is gradually pressed against the fingerprint read window 11 with the pressure applied from the finger press band 2, and is positioned such that the center of the fingerprint is located above the scanner unit 5. In this state, when the scanner operation of the scanner unit 5 is started, the image pickup operation of the fingerprint image of the finger F and authentication are performed.

In this case, as shown in FIG. 3, if a finger sensor 4 for detecting the finger F is arranged at the downstream-side portion of the fingerprint read window 11 in the inserting direction of the finger F and the scanner unit 5 is driven by the detection output from the finger sensor 4, the image pickup operation of the fingerprint image of the finger F and the like can be performed automatically. This finger sensor 4 is constituted by, e.g., an optical sensor for detecting the presence/absence of the finger in accordance with the density of the incident light.

According to this embodiment, since the finger F can be fixed with the finger press band 2 when picking up the image of the fingerprint, an unintentional movement of the finger F during the image pickup operation can be prevented, so that an effective fingerprint image can be picked up. Since the finger F is fixed through the soft, elastic finger press band 2, pain to the finger can be prevented. In particular, when inserting the finger, since the width of the central portion of the finger press band 2 is smaller than those of the two wings, the finger F can be inserted easily. If the finger press band 2 is made of a silicone resin, when the finger F is fixed, it comes into contact with the finger press band 2 with a comfortable touch, and the finger F can be positioned on the fingerprint read window 11 to correspond to the scanner unit 5 with an appropriate pressure.

The finger press band 2 may be formed with a stopper that locks the tip of the finger F in the inserting direction of the finger F, so that the finger F is always positioned at the optimum position on the fingerprint read window 11 to correspond to the scanner unit 5.

Figure 4:
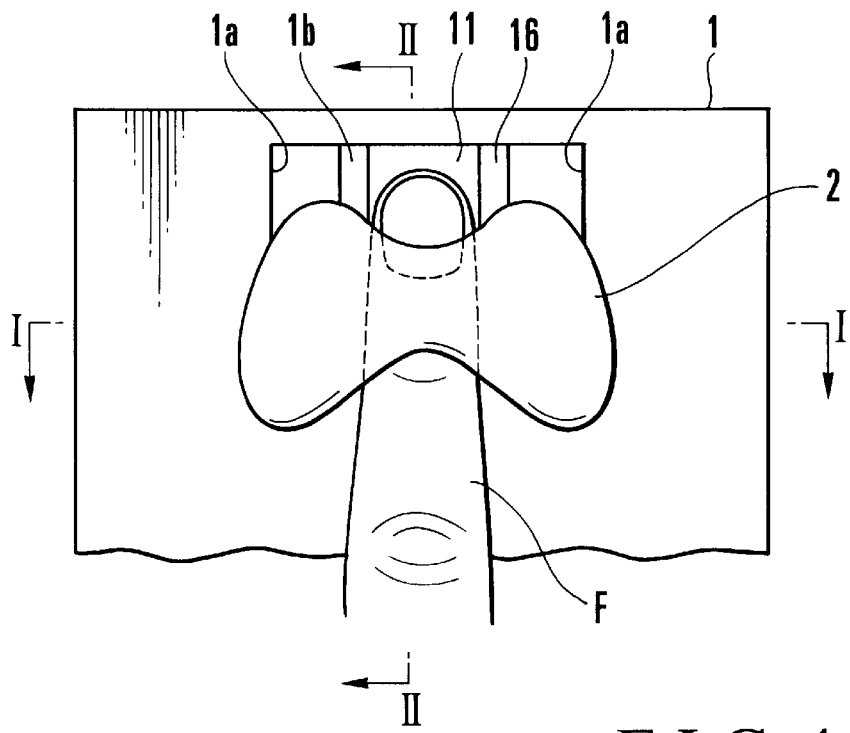
FIG. 4 is a plan view of a fingerprint authentication apparatus according to the second embodiment of the present invention.
Figure 5:
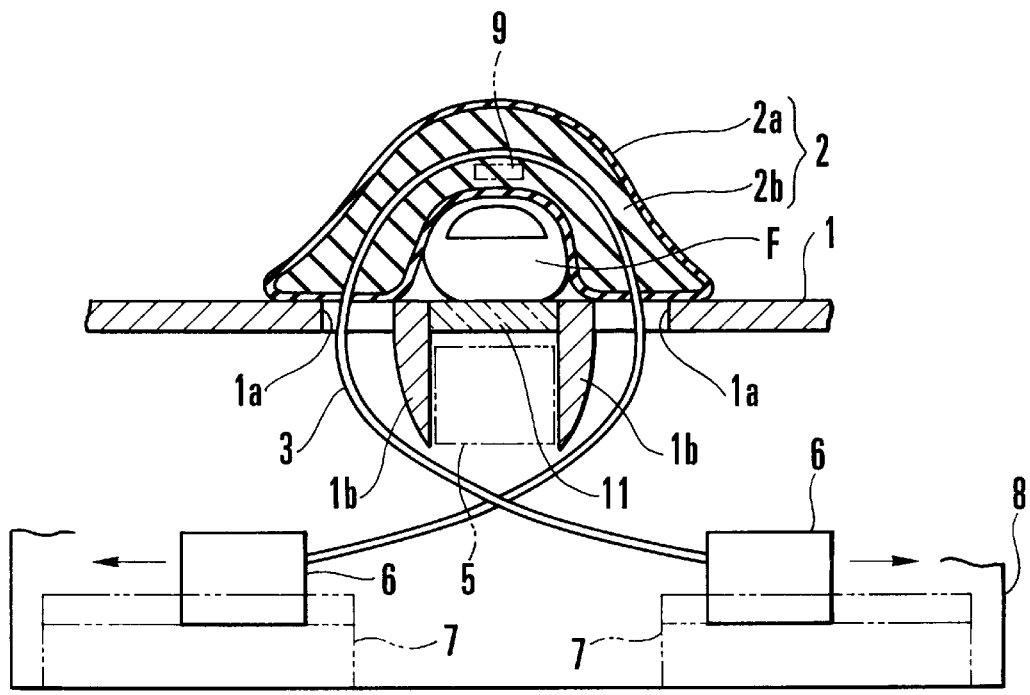
FIG. 5 is a sectional view taken along the line I—I of FIG. 4.

FIG. 4 shows a fingerprint authentication apparatus according to the second embodiment of the present invention, FIG. 5 shows a section taken along the line I—I of FIG. 4, and FIG. 6 shows a section taken along the line II—II of FIG. 4. Referring to FIG. 5, the fingerprint authentication apparatus has a base 1, a thick finger press band 2, a string-like web 3, a scanner unit 5, a pair of drive mechanisms 7, and a pressure sensor 9. The base 1 has a rectangular fingerprint read window 11 made of transparent glass, and a pair of through holes 1a formed on the two side portions of the fingerprint read window 11. The finger press band 2 is placed on the base 1 to correspond to the fingerprint read window 11 and through holes 1a, and is formed into an inverted U-letter shape to ensure a space slightly smaller than the sectional area of one finger F. The string-like web 3 extends through the through holes 1a and tightens the finger F through the finger press band 2. The scanner unit 5 is arranged below the fingerprint read window 11 to correspond to the positioned finger F. The pair of drive mechanisms 7 move corresponding movable members 6, arranged on the two ends of the string-like web 3, in a direction perpendicular to the inserting direction of the finger F. The pressure sensor 9 is arranged in the finger press band 2 to detect the tightening pressure of the finger F.

The finger press band 2 is formed by sealing a soft member 2b in a soft cover 2a. For example, the soft cover 2a is made of cloth, and the soft member 2b sealed in the soft cover 2a is cotton. Hence, the finger press band 2 has the structure of a so-called stuffed object. Regarding the outer appearance of the finger press band 2, as shown in FIG. 4, the central portion of the finger press band 2 that covers the finger F has a width smaller than that of the two end portions in the finger inserting direction. This allows the finger to be inserted between the finger press band 2 and the base 1 comparatively easily.

In this embodiment, as shown in FIG. 5, the finger press band 2 is not fixed to the base 1, but merely the web 3 extends through the soft member 2b and is placed on the base 1. The finger press band 2 is positioned in the inserting direction of the finger F by setting the positions of the two ends of the web 3. The two end portions of the finger press band 2 may be fixed to the base 1 with an adhesive or the like, as in the first embodiment. The pressure sensor 9 is arranged at a portion in the finger press band 2 to correspond to the nail side of the finger F, and comprises a piezoelectric element or the like. When the finger F comes into contact with the finger press band 2 to apply a load to the pressure sensor 9, an output corresponding to the load is obtained from the pressure sensor 9. The pressure sensor 9 is arranged in the soft member 2b between the soft cover 2a and the web 3, which comes into contact with the finger F.

The web 3 is made of a belt-like metal material (steel) which has substantially no stretching properties in the longitudinal direction but can be deformed easily by bending. The central portion of the web 3 extends from one side to the other side of the finger press band 2 in a direction perpendicular to the inserting direction of the finger F. The belt surface of the web 3 opposes a surface of the finger press band 2 which is in contact with the finger F. The two end portions of the web 3 extending through the finger press band 2 are guided outside the finger press band 2 from portions of the two wings of the finger press band 2 that abut against the base 1, and are respectively led below the base 1 through the pair of through holes 1a formed in the base 1.

The base 1 is formed with the fingerprint read window 11 between the pair of through holes 1a, and the scanner unit 5 for picking up the image of the fingerprint is loaded below the fingerprint read window 11. Therefore, the finger press band 2 through which the web 3 is inserted extends above the fingerprint read window 11. A space equal to or larger than the sectional area of two or more fingers is ensured between the fingerprint read window 11 and the belt surface of the web 3. Reference numerals 1b denote a pair of guides that prevent the web 3 from coming into contact with the scanner unit 5. The guides 1b vertically project from the base 1 on the two side portions of the scanner unit 5, and their outer surfaces that can come into contact with the web 3 are formed arcuately. The through holes 1a of the base 1 are formed to have a predetermined width from the outer side edges of the guides 1b in directions opposite to the fingerprint read window 11.

The two end portions of the web 3 led below the base 1 through the through holes 1a intersect each other below the scanner unit 5 such that they do not come into contact with each other, and are fixed to the movable members 6. The movable member 6 are driven by the drive mechanisms 7 to be able to move in directions parallel to the surface of the base 1 and perpendicular to the inserting direction of the finger F. For example, the movable members 6 have rack gears, and the drive mechanisms 7 have pinion gears that mesh with the rack gears, and drive motors for driving the pinion gears. Reference numeral 8 denotes a fixing base to which the drive mechanisms 7 are fixed.

As shown in FIG. 6, a finger sensor 4 for detecting insertion of the finger F is arranged at the front end portion of the fingerprint read window 11 in the inserting direction of the finger F. The finger sensor 4 is arranged at such a position that, upon sensing the tip of the finger F, the skin surface of the finger F is located precisely above the fingerprint read window 11.

FIG. 7 shows the arrangement of the control system of the finger fixing apparatus of this embodiment. A controller 10 drives the drive mechanisms 7 based on the output from the finger sensor 4, and stops the operation of the drive mechanisms 7 and starts the operation of the scanner unit 5 based on the output of the pressure sensor 9.

The operation of the fingerprint authentication apparatus having the above arrangement will be described.

The person to be authenticated inserts his finger F between the base 1 and the finger press band 2. When the inserted finger F is detected by the finger sensor 4, the controller 10 actuates the drive mechanisms 7. The movable members 6 move in directions to separate from the finger F, in order to pull the two ends of the web 3. Therefore, the finger press band 2 is urged against the finger F and fixes the finger F while being deformed. At this time, since the through holes 1a of the base 1 are formed to extend to the bases of the guides 1b and the finger press band 2 is not fixed to the base 1, the two wings of the finger press band 2 slide on the base 1 in directions to come close to the finger F, thereby fixing the finger F not only from above but also from the two sides.

In the finger press band 2, the load of the finger sensor 4 located between the web 3 and the finger F gradually increases, and accordingly the output from the finger sensor 4 gradually changes. The controller 10 monitors the output from the finger sensor 4 and stops the operation of the drive mechanisms 7 when the output from the finger sensor 4 becomes equal to or larger than a preset threshold, i.e., when it detects that the finger F is tightened with a pressure equal to or larger than a constant pressure. Therefore, the finger F is held to be fixed with the constant pressure.

When the operation of the drive mechanisms 7 is stopped, the controller 10 automatically actuates the scanner unit 5 to pick up the image of the fingerprint through the fingerprint read window 11. Thereafter, upon reception of a pickup end signal from the scanner unit 5, the controller 10 actuates the drive mechanisms 7 again to decrease the distance between the movable members 6 this time, thereby restoring the drive mechanisms 7 to the initial positions. This loosens the web 3 to release the finger F.

According to this embodiment, since the finger F is fixed by the web 3 when picking up the image of its fingerprint, an unintentional movement of the finger F during the image pickup operation can be prevented, so that an effective fingerprint image can be picked up. Since the finger F is fixed through the soft finger press band 2, unpleasant pain to the finger F can be prevented.

Since the drive mechanisms 7 are stopped when the output from the pressure sensor 9 becomes equal to or larger than the constant value, the finger F can always be fixed with a constant pressure. This stabilizes the fingerprint image of the target finger F subjected to the image pickup operation, so that an effective fingerprint image can be obtained easily.

Since the web 3 is formed into the shape of a belt, it can apply a uniform pressure to the finger F with a comparatively large area. As a result, when the fingertip is fixed within a wide range, a more stable fingerprint image can be obtained. Since no local pressure is applied to the finger F, pain to the finger F can be prevented.

In addition, since the finger press band 2 is formed by covering the soft member 2b with the soft cover 2a, it has a good outer appearance, and contamination attaching to it and the like can be cleaned easily so that the finger press band 2 has a long service life. Since the guides 1b are arranged on the two sides of the scanner unit 5 and the surfaces of the guides 1b that abut against the web 3 are formed arcuatedly, the scanner unit 5 can be protected, and damage to the web 3 can be prevented. When the mounting position of the finger sensor 4 is adjusted to the optimum position, the finger F can be positioned at the optimum position in the inserting direction, so that an effective fingerprint image can be obtained easily.

One end of the web 3 may be fixed while the other end thereof may be free. The web 3 may be constituted by a bundle of a plurality of wire-like members. If at least one of the soft cover 2a and the soft member 2b is comparatively hard, the web 3 may be constituted by one wire. The movable members 6 may move in the vertical direction or any other direction as far as it can tighten the finger F.

In the above embodiments, the fingerprint read window 11 and the scanner unit 5 are formed as separate components. However, the fingerprint read window 11 may constitute a read surface integral with the scanner unit 5.

As has been described above, according to the present invention, since the finger F can be fixed with the finger press member when picking up the image of the fingerprint, an unintentional movement of the finger F during the image pickup operation can be prevented, so that the possibility of picking up an effective fingerprint image can be increased. Since the finger is fixed with the soft, elastic finger press band, pain to the finger can be prevented.

What is claimed is:

1. A finger fixing apparatus comprising:

a base having a fingerprint read window;

a scanner unit arranged below said fingerprint read window; and a finger press member extending above said fingerprint read window in a direction perpendicular to a finger inserting direction while ensuring a predetermined space, said finger press member being positioned to correspond to said fingerprint read window, wherein said finger press member moves in a downward direction toward said fingerprint read window so that said predetermined space corresponds to a height of a finger inserted therein.

2. An apparatus according to claim 1, wherein said finger press member extends above said fingerprint read window to be separate therefrom by a space slightly smaller than a sectional area of one finger, and said finger press member has two ends that are fixed to said base on two side portions of said fingerprint read window.

3. An apparatus according to claim 2, wherein said finger press member is formed thick of a silicone resin.

4. An apparatus according to claim 1, wherein said finger press member has a central portion a width of which is smaller than those of two wings thereof connected to a surface of said base.

5. A finger fixing apparatus comprising:

a base having a fingerprint read window;

a scanner unit arranged below said fingerprint read window;

a finger press member extending above said fingerprint read window in a direction perpendicular to a finger inserting direction while ensuring a predetermined space, said finger press member being positioned to correspond to said fingerprint read window; and a finger sensor arranged at a downstream-side portion of said fingerprint read window in the finger inserting direction to detect the presence of the finger inserted in said finger press member, wherein said scanner unit starts a scanner operation upon detection of an output from said finger sensor.

6. A finger fixing apparatus comprising:

a base having a fingerprint read window;

a scanner unit arranged below said fingerprint read window;

a finger press member extending above said fingerprint read window in a direction perpendicular to a finger inserting direction while ensuring a predetermined space, said finger press member being positioned to correspond to said fingerprint read window;

a pair of through holes formed in said base at two side portions of said fingerprint read window;

a string-like tightening member extending through said finger press member and having first and second end portions that are respectively led below said base through said through holes; and drive means for leading at least one of said first and second end portions of said tightening member to below said base, when a finger is inserted in the space of said finger press member, thereby tightening the finger through said finger press member and positioning the finger on said fingerprint read window.

7. An apparatus according to claim 6, wherein
said finger press member extends above said fingerprint read window to be separate therefrom by a space not smaller than a sectional area of one finger, and
said finger press member is held on said fingerprint read window with only said tightening member.

8. An apparatus according to claim 6, wherein said finger press member is constituted by
a bag-like soft cover, and
a soft member filled in said soft cover.

9. An apparatus according to claim 6, further comprising
a finger sensor arranged at a downstream-side portion of said fingerprint read window in the finger inserting direction to detect the presence of the finger which is inserted,
a pressure sensor for detecting a pressure applied by said tightening member to the inserted finger, and
control means for actuating said drive means upon reception of a detection output from said finger sensor to start a tightening operation of said tightening member and, when a detected pressure of said pressure sensor exceeds a predetermined value, stopping said driving means and starting a scanner operation of said scanner unit.

10. An apparatus according to claim 9, wherein said drive means comprises
first and second movable members to which said first and second end portions of said tightening member, that intersect each other below said base, are connected, and
first and second drive mechanisms for moving, when a finger is inserted, said first and second movable members in directions perpendicular to the finger inserting direction so as to be separate from said fingerprint read window.

11. An apparatus according to claim 9, wherein said drive means comprises
a movable member to which said first end portion of said tightening member that, below said base, intersects said second end portion of said tightening member which is fixed, is connected, and
a drive mechanism for moving, when a finger is inserted, said movable member in a direction perpendicular to the finger inserting direction so as to be separate from said fingerprint read window.

12. An apparatus according to claim 6, wherein said tightening member is constituted by a metal web having a predetermined width.

* * * * *